United States Patent Office 3,335,185
Patented Aug. 8, 1967

3,335,185
RECOVERY OF DIPHENYLAMINES AND RESORCINOLS BY THIN-LAYER CHROMATOGRAPHY METHODS
Hiram W. H. Dykes, Huntsville, Ala., assignor to the United States of America as represented by the Secretary of the Army
No Drawing. Filed June 30, 1965, Ser. No. 469,971
9 Claims. (Cl. 260—576)

The invention described herein may be manufactured and used by or for the Government for governmental purposes without the payment of any royalty thereon.

This invention relates to analysis of propellant stabilizers and more particularly to a thin-layer chromatographic process for the separation of resorcinol, 2-nitrodiphenylamine and degradation products of the same for qualitative and quantitative determinations.

Propellant compositions containing nitrocellulose are known to change in structure during storage, with decomposition resulting in the formation of oxides of nitrogen. As a result, the propellant undergoes changes in characteristics which effect the burning rates so that the performance cannot be readily predicted.

The need for adding material to stabilize nitrocellulose against decomposition was apparent. Diphenylamine has been used extensively as a stabilizer in explosives and propellants containing nitrocellulose. In the capacity as stabilizer, it presumably stabilizes the nitrocellulose composition by combining continuously with the nitrogen oxides which arise from the decomposition of the nitrocellulose and thus decreases the autocatalytic effect of these products on the further decomposition of the nitrocellulose. The reaction is believed to proceed by first converting diphenylamine to N-nitrosodiphenylamine which is oxidized to 4-nitrodiphenylamine which, in turn, is nitrosated; the N-nitroso-4-nitrodiphenylamine subsequently rearranges and is oxidized to form dinitro derivatives. The apparent end product after several nitration stages of reaction is a trinitro derivative.

Improved stabilization of propellants has been obtained by using resorcinol in combination with the 2-nitrodiphenylamine. Resorcinol apparently reacts with oxides of nitrogen in a manner similar to 2-nitrodiphenylamine to form nitro and nitroso derivatives, such as, 2-nitroresorcinol, 2,4-dinitrosoresorcinol, 2,4-dinitroresorcinol, and 2,4,6-trinitroresorcinol. It may be readily seen that the use of resorcinol in addition to 2-nitrodiphenylamine has greatly increased the complexity of the mixture in that numerous additional degradation products can be formed.

The determination of the state of the stabilizers in any given sample of propellant will give information about the history of the propellant during storage and an indication of its future usefulness. The presence of more than one stabilizer has advantages in that greater propellant stability is obtained. However, the complexity of checking the stabilizers and separating them and their degradation products became a difficult problem and needed to be solved in order to predict usefulness of the propellant.

The separation for identity and quantitative determination of micro quantities of stabilizers is essential in propellant quality control. Further evaluation after production is accomplished by measuring micro quantities of degradation products to determine the indicated degree of stability. It follows that as the stabilizers become nitrated the amount of stabilizer decreases with a proportionate increase in degradation products. Degradation products progressively nitrated will cause a continued increase in trinitro derivatives. The advanced degree of nitrated derivatives increases the complexity of separation since the compounds differ only in composition only by the number of nitro groups added to original stabilizer.

The examples given later will illustrate several embodiments to most easily accomplish the separation needed for a particular combination of stabilizers and degradation products of the same. A simple separation of the stabilizers alone in a stabilized propellant is given. Also, a more elaborate procedure is given to be used if first indications reveal a propellant is unstable. A complex separation can be accomplished with a minimum selection of developers employing fewer directions of separation.

Column chromatography has been used to estimate N-nitro and nitrodiphenylamine products in smokeless power. It became readily apparent that when the quantity of the sample to be determined is only present in micro quantity the column chromatography method does not produce a satisfactory resolution of many compounds present in the same sample.

Thin-layer chromatography generally is described as a method to accomplish separation based on the observation of the division of substances into zones on a thin layer of adsorbent using one drop of the substance. The method enables one to obtain satisfactory results using one drop of the substance under test, very small quantities of the adsorbent and minimal time. The passing of a liquid through the layer of an adsorbent containing a sample thereon to affect a separation is an essential step. The movement of the liquid is usually allowed to proceed for a predetermined distance, for example, 10 centimeters. A very key factor in separation is a term referred to as $Rf$ which is the distance traveled by a given substance divided by the distance traveled by the solvent front. Both distances are measured from the origin. As will be later described, the liquid referred to as developer, will cause different compounds to migrate a different distance or will not cause a migration at all. Therefore, the differences in $Rf$ values of the compounds separated for the developer employed, makes possible the zoning of compounds in this technique of thin-layer chromatography. The separation into well defined zones makes the compounds readily available for identity and quantitative analyses as may be required for problem solution.

The objective of the present invention is to provide a method for checking propellants to determine future usefulness based on stability. More specifically, the object is to provide a method for separating resorcinol, 2-nitrodiphenylamine and degradation products of the same for qualitative and quantitative determination in compositions.

Another object of the invention is to provide a method useful and applicable for field test conditions.

In accordance with the present invention, resorcinol, 2-nitrodiphenylamine and degradation products thereof are separated by a thin-layer chromatography method using multi-directional development with different developers for each direction. This method provides a rapid and convenient means of separation for qualitative and quantitative determination. Only a minute sample is required so that the extent of decomposition of a missile propellant can be determined without affecting its ballistics performance from loss of propellant due to sampling the same.

The propellant sample is first dissolved in a suitable inert organic solvent having a low boiling point, acetone being preferred. For typical nitrocellulose, propellant compositions having nominal stabilizer concentrations of 1% resorcinol and 0.2% 2-dinitrodiphenylamine, a sample as small as 100 milligrams may be used in a 1 ml., portion of solvent. A small portion of the resulting solution of sample, preferably about 5 microliters is spotted on the adsorbent plate. Spotting is the term used in this art which comprises dropping or adding a sample to an adsorbent layer.

The adsorbent layer in the present method consists of either aluminum oxide with gypsum binder or silica gel with gypsum binder affixed to an inert flat surface, normally a thin glass plate. An adsorbent layer thickness of about 150 to 400 microns and preferably about 250 microns, is satisfactory. The method of preparing the adsorbent plate is not critical, and conventional techniques may be used. In a preferred procedure, a glass plate measuring 8″ x 8″ is cleaned thoroughly in a typical chromic acid cleaning solution followed by rinsing in distilled water and allowing to dry. The selected adsorbent with gypsum binder is prepared by mixing one part to two parts of distilled water. The material is stirred until a uniform slurry is obtained, after which the type adsorbent specified is applied to plate and spread out to leave a thin-layer of about 250 microns thick on the plate. After allowing the plates to dry for about 10 minutes, the prepared plate is heated in a drying oven for about 1 hour at 100–110° C. to complete drying and activating of the plate. The plate so prepared is now ready for sample spotting.

Spotting of a sample consists of taking a quantity of dissolved sample in a syringe of 5 microliter capacity, placing contents of same on a prepared adsorbent plate about 3 centimeters from the edge of said plate, allowing the excess solvent to evaporate, after which, the thin sample appears as a small spot on plate. The spotted plate is now ready for development.

Development in thin-layer chromatography consists of allowing a liquid referred to as developer to pass through the spotted layer to affect a separation. The development in this instant case can be accomplished by placing the edge of a spotted adsorbent plate in developer selected from the group consisting of n-hexane, carbon disulfide, carbon tetrachloride, trichloroethylene, toluene, benzene, methylene chloride, chloroform, ether, ethyl acetate, methyl acetate, acetone, n-propyl alcohol, ethyl alcohol, methyl alcohol and water. These developers are selected from the normal eluotropic series, which is generally made up of a listing of solvents from a lower polarity to a higher polarity. The more polar solvents producing the greatest migrations are at the bottom of the series. Several techniques are helpful in selection of solvents; however, since movement over an adsorbent plate varies from plate to plate, it is helpful to make tests with the particular adsorbent and compounds to be separated on the prepared adsorbent plate.

A preliminary study can be made in two ways. A sample can be spotted at various points on an adsorbent plate, and then pure solvents of different polarities can be added to the center of each spot. The solvent which moves the sample the greater distance can be noted, and the solvent which moves the sample an intermediate distance from the origin can be observed. The solvent which moves the sample the intermediate distance is preferred in multidirectional separation so that the sample is not moved to an extreme edge of the adsorbent plate. The second way to make a preliminary study is by running chromatograms with various solvents. The latter method was used in arriving at the following described procedures wherein a selection of solvent is noted. It has been found that even though a solvent can move a compound, selection can be limited to specific solvents in a preferred embodiment employing fewer directions of separations. It should be mentioned that the embodiments and examples given later will illustrate that separation can be accomplished by several solvents; however, the number of compounds in a composite sample make it necessary to vary the order of selection to accomplish maximum separation employing fewer manipulations. Hence, the examples listing specific solvents are preferred to use when maximum separation is desired with fewer directions involved.

A preferred development procedure in the present method is to have the aforementioned developers in sealed containers of adequate size to permit insertion of plates so that they can be allowed to stand in the vertical position with the lower edge dipped into the developing solvent while the upper part of the adsorbent plate remains in a saturated atmosphere of the developer. It has been found that development takes place more rapidly under these conditions. The container can be almost any shape; however, a rectangular shaped container works very satisfactorily since several plates can be developed at the same time provided care is taken to completely saturate the system. Saturation of developer chamber is normally accomplished by partially lining the walls with filter paper which dips into the developer and when possible, by shaking the chamber before the introduction of the chromatogram. The spotted sample should be above the developer surface when the plate is lowered into the developer. The loss of sample is prevented by using this procedure, and the preferred procedure is to allow the developer to ascend up the adsorbent plate to a measured height of approximately 10 centimeters from the point of sample application.

After developing in this manner, the plate is allowed to dry of excess developer, and the separated components can be observed as new spots on plate identifiable by several methods including comparing to a known, characteristic color, coloration developed from a chemical sprayed onto spots, spectographic measurements or colorimetry measurements. All of the compounds concerned with in this procedure were identified as separated except resorcinol which was distinctly brought out with a silver nitrate solution sprayed onto plate which turned the resorcinol black. In the examples given later, the identity of sample component was established by comparing sample components separated to known standard prepared for each compound expected to be in the sample for the particular embodiment.

Resorcinol and 2-nitrodiphenylamine alone can be determined by the following procedure. The propellant sample containing these stabilizers and separate samples containing known quantities of the same are spotted at separate points on silica gel adsorbent with gypsum binder. The spotted plate is then developed in benzene by the procedure described above, 2-nitrodiphenylamine being separated by this step. The relative areas are then determined. The plate is then developed with ethyl acetate, and resorcinol is separated from the propellant sample and the standard. The areas of spots are determined and the percent stabilizer can be calculated as described later herein. If the amounts agree very closely with the expected concentrations known to be in the propellant formulation, then the more involved technique now described may not be required.

An individual separation of components in an eleven compound embodiment can be accomplished by procedure described below with selection of particular adsorbent and proper selection of developers. When the adsorbent is silica gel in a gypsum binder, 2-nitrodiphenylamine and 2-nitroresorcinol can be separated in a first directional separation by any one of the developers selected from the group of developers consisting of carbon disulfide, carbon tetrachloride, trichloroethylene, toluene, benzene, methylene chloride, chloroform and acetone. The compounds 2,4′-dinitrodiphenylamine and 2,4,4′-trinitrodiphenylamine can be separated in a second directional separation by any one of the developers selected from the group of developers consisting of trichloroethylene, toluene, benzene, methylene chloride, chloroform, acetone and ethyl acetate. Ethyl acetate will separate 2,2′-dinitrodiphenylamine, 2,4-dinitrodiphenylamine, 2,2′,4,4′,6,6′-hexanitrodiphenylamine and resorcinol in a third directional separation. The compounds 2,4-dinitroresorcinol and 2,4,6-trinitroresorcinol can be separated by either methyl acetate or acetone in a fourth directional separation. The separation of 2,4-dinitrosoresorcinol can be accomplished by developer water in a fifth directional separation. The essential operations mentioned in the above separation include drying excess developer from adsorbent plate between developing steps and also, the selection of developers should be made so that when separation is accomplished in many directions, no solvent can be selected and again selected for the next step involving separations on a single adsorbent plate from a single group of compounds in a composite sample.

In an embodiment comprising aluminum oxide adsorbent in a gypsum binder and a composite sample containing eleven compounds, separation can be accomplished for 2-nitrodiphenylamine 2,2'-dinitrodiphenylamine, 2,4-dinitrodiphenylamine, 2,4'-dinitrodiphenylamine, 2,4,4'-trinitrodiphenylamine and 2-nitroresorcinol by a developer selected from the group of developers consisting of trichloroethylene, toluene and benzene in a first directional separation. The compounds 2,4-dinitrosoresorcinol, 2,4-dinitroresorcinol and 2,4,6-trinitroresorcinol can be separated by water in a second directional separation. The compounds resorcinol and 2,2',4,4',6,6'-hexanitrodiphenylamine can be separated by propyl alcohol in a third directional separation. As before mentioned, drying between steps of separation is essential.

In a preferred embodiment, eleven compounds are separated on adsorbent aluminum oxide with gypsum binder, by use of three developers in a three directional separation. The compounds separated by first directional developer, trichloroethylene, on said adsorbent comprise 2-nitrodiphenylamine, 2,2'-dinitrodiphenylamine, 2,4-dinitrodiphenylamine, 2,4'-dinitrodiphenylamine, 2,4,4'-trinitrodiphenylamine, and nitroresorcinol. The compounds separated in a second direction perpendicular to first direction on same plate with developer water comprise 2,4-dinitrosoresorcinol, 2,4-dinitroresorcinol and 2,4,6-trinitroresorcinol. The third directional separation on same plate parallel with first directional separation using developer propyl alcohol separates two compounds remaining, namely, 2,2',4,4',6,6'-hexanitrodiphenylamine and resorcinol.

In another embodiment, eleven compounds are separated on adsorbent, silica gel with gypsum binder, by use of five developers in a five directional separation. The compounds 2-nitrodiphenylamine and 2-nitroresorcinol were separated by developer carbon disulfide on said adsorbent surface in a first directional separation. The compounds 2,4'-dinitrodiphenylamine and 2,4,4'-dinitrodiphenylamine were separated in a second directional separation by developer trichloroethylene. The compounds separated by the third directional separation by developer ethyl alcohol comprised 2,2'-dinitrodiphenylamine, 2,4-dinitrodiphenylamine, 2,2',4,4',6,6'-hexanitrodiphenylamine and resorcinol. The fourth directional separation by developer acetone separated 2,4-dinitroresorcinol, and 2,4,6-trinitroresorcinol. The remaining compound 2,4-dinitrosoresorcinol was separated by water in a fifth directional separation.

The first embodiment given above is preferred for quantitative determination which will now be described. The general procedure consists of developing a spotted sample of compound to be determined which contains a known concentration along with sample composite containing an unknown amount of the same compound. After development is accomplished, the area of the known is determined and the area of the compound in the composite sample is determined in both cases by use of a planimeter. The mathematical relationship $$\frac{Ws}{As} = \frac{W}{A}$$

applies, where $Ws$=weight of standard material in spot expressed in milligrams, $As$=area of standard spot in sq. mm., $W$=weight of material spot for compound being determined, expressed in milligrams, and $A$=area of material spot for compound being determined. The requirement that weight in standard spot should be within ±0.2% of weight in unknown should be met for greater accuracy. Therefore, it is preferred that several variable amounts of known be spotted along plate being developed and selection be made of the spot and area which compares more closely with unknown. Also, it is obvious that the developer should be selected which is appropriate for the compound to be determined. For example, if the qualitative determination has established what compounds are present, then a precisely measured amount of unknown sample could be added to three separate adsorbent plates along with standard concentration of each compound spotted at separate points; then, development could be done simultaneously in the appropriate developer for each part of the embodiment mentioned above.

The following examples are given for illustrative purposes.

*Example I*

A 100 mg. sample of nitrocellulose base propellant containing both 2-nitrodiphenylamine and resorcinol as stabilizers was dissolved in 1 ml. of acetone to give a solution so that a 5 microliter portion of resulting solution when added to the adsorbent plate would contain at least 1 microgram of stabilizer present in least quantity.

Solutions were prepared to contain various concentrations of each stabilizer, with absolute ethyl alcohol as the solvent.

Known volumes of the standard solutions and propellant samples were spotted 3 cm. from the bottom edge of the plates with a microliter syringe. By taking various volumes of the same solution, different weights were obtained. After spotting the plates, the solvent was evaporated. Two plates were used for each series of analyses for the stabilizers.

The plates were developed in a depth of 1 cm. of developer, in the usual ascending direction for a distance of 10 cm. for the developer front. The plate containing known amounts of 2-nitrodiphenylamine and the spotted propellant sample was developed in benzene. The benzene separated 2-nitrodiphenylamine from the spotted known and from the spotted propellant sample. After drying plate of excess developer compound 2-nitrodiphenylamine was visible and a sheet of tracing paper was placed on the plate; the outline of the spot was traced on the paper. The area of the spot was then determined from the outline using a planimeter.

The plate was developed in a direction perpendicular to first using water as the developer. After the plate was air dried, it was sprayed with 0.1 percent silver nitrate followed by 1 N ammonium hydroxide in methanol/water. The spraying rendered the previously invisible spots of resorcinol visible as black spots. The areas of these spots were determined as noted above for the 2-nitrodiphenylamine.

The recovery of each stabilizer from propellant based on formulation was with a relative error of ±5 percent. Since no apparent decrease in stabilizer content from known concentration was noted, it was obvious that if degradation products of stabilizers were present, the concentration of these would be below the level of detection. Hence, another procedure was devised to illustrate how the degradation products could be separated, if present as noted in Example II.

*Example II*

A 100 mg. sample of nitrocellulose propellant containing two stabilizers was dissolved as in Example 1 using 1 ml. of acetone as solvent. An addition of an acetone solution containing nine possible degradation products was made to the original 1 ml. sample to give quantity of about 0.2 milligram of each degradation product present. The composite degradtion sample was made by adding equal quantities of nine degradation products to make a 10% solution of acetone. Then, approximately .02 ml. of composite solution was added to acetone propellant sample.

A 5 microliter sample of the above sample containing eleven compounds comprising 2-nitrodiphenylamine, 2,2'-dinitrodiphenylamine, 2,4-dinitrodiphenylamine, 2,4'-dinitrodiphenylamine, 2,4,4'-dinitrodiphenylamine, 2,4,4'-trinitrodiphenylamine, 2,2',4,4',6,6' - hexanitrodiphenylamine, resorcinol, 2,4-dinitrosoresorcinol, 2,4-dinitroresorcinol and 2,4,6-trinitroresorcinol was spotted on an adsorbent plate of silica gel with gypsum binder.

The spotted adsorbent plate was developed first in carbon disulfide and excess developer allowed to dry. The compounds separated were 2-nitrodiphenylamine and nitroresorcinol.

The same plate was again developed; however, the development was done in a direction perpendicular to the first direction using developer trichloroethylene and 2,4'-dinitrodiphenylamine and 2,4,4' - trinitrodiphenylamine were separated.

After plate was dried, the same plate was developed in a third direction using ethyl acetate as the developer; plate was allowed to dry, and compounds separated were noted as 2,2'-dinitrodiphenylamine, 2,4-dinitrodiphenylamine, 2,2',4,4',6,6'-hexanitrodiphenylamine and resorcinol.

After plate was dried, the sample plate was developed in a fourth direction using acetone as the developer; the plate was allowed to dry of excess developer. The compounds separated were noted as 2,4-dinitroresorcinol and 2,4,6-trinitroresorcinol.

The same plate was developed in water in a fifth direction whereby 2,4-dinitrosoresorcinol was separated.

Example III

A sample of nitrocellulose propellant containing stabilizers, 2-dinitrodiphenylamine and resorcinol, was dissolved as in Example II and degradation products were added which comprised 2-nitroresorcinol, 2,4-dinitrodiphenylamine, 2,4-dinitrosoresorcinol, 2,2',4,4',6,6'-hexanitrodiphenylamine, 2,4,6-trinitroresorcinol and 2,4-dinitroresorcinol.

Since this composite sample contained only eight compounds to be separated the development could be shortened. Adsorbent plate used contained silica gel with gypsum binder. The development was accomplished by same technique as in previous examples except selection of developers was to include benzene, water, and ethyl acetate.

First developer used comprised benzene, whereby, 2-nitrodiphenylamine was separated. Second developers was water and the compounds separated were 2-nitroresorcinol and 2,4-dinitrodiphenylamine. The third developer was ethyl acetate which separated resorcinol, 2,4-dinitrosoresorcinol, 2,2',4,4',6,6'-hexanitrodiphenylamine, 2,4,6-trinitroresorcinol and 2,4-dinitroresorcinol.

Example IV

A sample of propellant containing 2-nitrodiphenylamine and resorcinol was dissolved in acetone as noted above. A 5 microliter sample was spotted on silica gel adsorbent surface containing gypsum binder.

The sample was developed in benzene by standard procedure and 2-nitrodiphenylamine was separated. After drying, the same plate was developed in ethyl acetate and resorcinol was separated.

The above examples were given to illustrate the various techniques used in the thin-layer chromatographic method of separating two stabilizers, 2-nitrodiphenylamine and resorcinol, and degradation products of the same when combined together, whereby, separation is accomplished for the detection and estimation of amounts of each present.

For specific needs, the examples given as follows give procedures for two embodiments wherein it is desired to separate only resorcinol and its degradation products. In one embodiment using silica gel adsorbent with gypsum binder, resorcinol and four of its degradation products are separated from a composite sample on one plate in a three directional separation. In a preferred embodiment using aluminum oxide adsorbent with gypsum binder, resorcinol and four of its degradation products are separated from a composite sample on one plate in a two directional separation.

Example V

A sample containing resorcinol, 2-nitroresorcinol, 2,4-dinitroresorcinol, 2,4-dinitrosoresorcinol, and 2,4,6-trinitroresorcinol in a 10% solution in acetone was spotted on a silica gel with gypsum binder adsorbent surface affixed to a glass plate by the regular procedure. The spotted sample was developed by the standard procedure, and the first developer, chloroform, separated 2-nitroresorcinol. After drying plate and developing same in a second developer, ether, the compounds, resorcinol, 2,4-dinitroresorcinol and 2,4,6-trinitroresorcinol were separated. After drying plate and developing same in a third developer, water, 2,4-dinitrosoresorcinol was separated. A solution of 0.1 silver nitrate in methyl alcohol was used as a visualization aid for spots on plate. The spray of silver nitrate turned the invisible resorcinol spot black and intensified the other spots formed by the other compounds separated.

Example VI

A sample containing resorcinol, 2-nitroresorcinol, 2,4-dinitroresorcinol, 2,4-dinitrosoresorcinol, and 2,4,6-trinitroresorcinol in a 10% solution in acetone was spotted on an aluminum oxide with gypsum binder adsorbent surface affixed to a glass plate by the regular procedure. The spotted sample was developed by the standard procedure, and the first developer, chloroform, separated, 2-nitroresorcinol. After drying plate and developing same in a second developer, water, the remaining compounds resorcinol, 2,4-dinitroresorcinol, 2,4-dinitrosoresorcinol and 2,4,6-trinitroresorcinol were separated. Visualization again was aided by spraying plate with 0.1% silver nitrate in methyl alcohol. The resorcinol was turned black and the spots of other compounds were intensified as noted before.

It will be understood that the invention is not to be limited to the details given herein but it may be modified within the scope of the appended claims.

What is claimed is:

1. The method of separating resorcinol and 2-nitrodiphenylamine from a mixture containing the same which comprises dissolving a sample of said mixture in a low boiling point inert organic solvent, spotting a small portion of the resulting solution on adsorbent surface comprising a thin layer of silica gel contained in a gypsum binder affixed to a plate, developing the resulting spotted plate in benzene, whereby 2-nitrodiphenylamine is removed from point of composite sample spotted on said plate to separate distinguishable point on said plate, allowing said plate to dry, developing same said plate in ethyl acetate, whereby resorcinol is removed to a separate distinguishable point on said plate.

2. The method of separating resorcinol, 2-nitrodiphenylamine and degradation products in the group consisting of 2,2'-dinitrodiphenylamine, 2,4-dinitrodiphenylamine, 2,4'-dinitrodiphenylamine, 2,4,4'-trinitrodiphenylamine, 2,2',4,4',6,6' - hexanitrodiphenylamine, 2 - nitroresorcinol, 2,4-dinitrosoresorcinol, 2,4-dinitroresorcinol and 2,4,6-trinitroresorcinol from a mixture containing the same which comprises dissolving a sample of said mixture in a low boiling point inert organic solvent, spotting a small portion of the resulting solution on adsorbent surface comprising a thin layer of silica gel contained in a gypsum binder affixed to a plate, developing the resulting spotted plate in a first developer selected from the group of developers consisting of carbon disulfide, carbon tetrachloride, trichloroethylene, toluene, benzene, methylene chloride, chloroform and acetone, whereby 2-nitrodiphenylamine and 2-nitroresorcinol are removed from point of composite sample spotted on said plate to separate distinguishable points on said plate, allowing said plate to dry, developing same said plate in a second developer selected from the group of developers consisting of trichloroethylene, toluene, benzene, methylene chloride, chloroform and acetone, said second developer being a different developer than said first developer, whereby 2,4'-dinitrodiphenylamine and 2,4,4'-trinitrodiphenylamine are removed to separate distinguishable points on said plate, allowing said plate to dry, developing same said plate in a third developer, ethyl acetate, whereby 2,2'-dinitrodiphenylamine 2,4-dinitrodiphenylamine, 2,2', 4,4',6,6'-hexanitrodiphenylamine and resorcinol are removed to separate distinguishable points on said plate, allowing said plate to dry, developing same said plate in a fourth developer selected from the group of developers consisting of methyl acetate and acetone whereby 2,4-dinitroresorcinol and 2,4,6-trinitroresorcinol are removed to separate distinguishable points of said plate, allowing said plate to dry, developing same said plate in a fifth developer, water, whereby 2,4-dinitrosoresorcinol is separated to a separate distinguishable point on said plate.

3. The method of separating resorcinol, 2-nitrodiphenylamine and degradation products in the group consisting of 2,2'-dinitrodiphenylamine, 2,4-dinitrodiphenylamine, 2,4'-dinitrodiphenylamine, 2,4,4'-trinitrodiphenylamine, 2,2',4,4',6,6' - hexanitrodiphenylamine, 2 - nitroresorcinol, 2,4-dinitrosoresorcinol, 2,4-dinitroresorcinol, and 2,4,6-trinitroresorcinol from a mixture containing the same which compromises dissolving a sample of said mixture in a low boiling point inert organic solvent, spotting a small portion of the resulting solution on an adsorbent surface comprising a thin layer of aluminum oxide contained in a gypsum binder affixed to a plate, developing the resulting spotted plate in a first developer selected from the group of developers consisting of trichloroethylene, toluene and benzene whereby 2-nitrodiphenylamine, 2,2' - dinitrodiphenylamine, 2,4 - dinitrodiphenylamine, 2,4'-dinitrodiphenylamine, 2,4,4'-trinitrodiphenylamine and 2-nitroresorcinol are removed to separate distinguishable points on said plate, allowing said plate to dry, developing same said plate in a second developer, water, whereby 2,4-dinitrosoresorcinol, 2,4-dinitroresorcinol and 2,4,6-trinitroresorcinol are removed to separate distinguishable points of said plate, allowing said plate to dry, developing same said plate in a third developer, n-propyl alcohol, whereby resorcinol and 2,2', 4,4',6,6'-hexanitrodiphenylamine are removed to separate distinguishable points on said plate.

4. The method of separating resorcinol, 2-nitrodiphenylamine and degradation products in the group consisting of 2,2'-dinitrodiphenylamine, 2,4-dinitrodiphenylamine, 2,4'-dinitrodiphenylamine, 2,4,4'-trinitrodiphenylamine, 2,2',4,4',6,6' - hexanitrodiphenylamine, 2 - nitroresorcinol, 2,4-dinitrosoresorcinol, 2,4-dinitroresorcinol and 2,4,6-trinitroresorcinol from a mixture containing the same which comprises dissolving a sample of said mixture in a low boiling point inert organic solvent, spotting a small portion of the resulting solution on adsorbent surface comprising a thin layer of silica gel contained in a gypsum binder affixed to a plate, developing the resulting spotted plate in a first developer, carbon disulfide, whereby 2-nitrodiphenylamine and 2-nitroresorcinol are removed from point of composite sample spotted on said plate to separate distinguishable points on said plate, allowing said plate to dry, developing same said plate in a second developer, trichloroethylene, whereby 2,4'-dinitrodiphenylamine and 2,4,4'-trinitrodiphenylamine are removed to separate distinguishable points on said plate, allowing said plate to dry, developing same said plate in ethyl acetate whereby, 2,2'-dinitrodiphenylamine, 2,4-dinitrodiphenylamine, 2,2',4,4',6,6' - hexanitrodiphenylamine and resorcinol are removed to separate distinguishable points on said plate, allowing said plate to dry, developing same said plate in acetone whereby 2,4-dinitroresorcinol and 2,4,6-trinitroresorcinol are removed to separate distinguishable points of said plate, allowing said plate to dry, developing same said plate in water whereby 2,4-dinitrosoresorcinol is removed to a separate distinguishable point on said plate.

5. The method of separating resorcinol, 2-nitrodiphenylamine and degradation products in the group consisting of 2,2'-dinitrodiphenylamine, 2,4-dinitrodiphenylamine, 2,4'-dinitrodiphenylamine, 2,4,4'-trinitrodiphenylamine, 2,2',4,4',6,6' - hexanitrodiphenylamine, 2 - nitroresorcinol, 2,4-dinitrosoresorcinol, 2,4-dinitroresorcinol, and 2,4,6-trinitroresorcinol from a mixture containing the same which comprises dissolving a sample of said mixture in a low boiling point inert organic solvent, spotting a small portion of the resulting solution on an adsorbent surface comprising a thin layer of aluminum oxide contained in a gypsum binder affixed to a plate, developing the resulting spotted plate in a developer, trichloroethylene, whereby 2-nitrodiphenylamine, 2,2'-dinitrodiphenylamine, 2,4 - dinitrodiphenylamine, 2,4' - dinitrodiphenylamine, 2,4,4'-trinitrodiphenylamine and 2-nitroresorcinol are removed to separate distinguishable points on said plate, allowing said plate to dry, developing same said plate in water whereby 2,4-dinitrosoresorcinol, 2,4-dinitroresorcinol and 2,4,6-trinitroresorcinol are removed to separate distinguishable points of said plate, allowing said plate to dry, developing same said plate in propyl alcohol whereby resorcinol and 2,2',4,4',6,6'-hexanitrodiphenylamine are removed to separate distinguishable points on said plate.

6. The method of separting resorcinol, 2-nitrodiphenylamine and degradation products in the group consisting of 2,4 - dinitrodiphenylamine, 2,2',4,4',6,6'-hexanitrodiphenylamine, 2 - nitroresorcinol, 2,4-dinitrosoresorcinol, 2,4-dinitroresorcinol and 2,4,6-trinitroresorcinol from a mixture containing the same which comprises dissolving a sample of said mixture in a low boiling point inert organic solvent, spotting a small portion of the resulting solution on adsorbent surface comprising a thin layer of silica gel contained in a gypsum binder affixed to a plate, developing the resulting spotted plate in a first developer, benzene, whereby 2-nitrodiphenylamine is removed from point of composite sample spotted on said plate to separate distinguishable points on said plate, allowing said plate to dry, developing same said plate in a second developer, water, whereby 2-nitroresorcinol and 2,4-dinitrodiphenylamine are removed to separate distinguishable points on said plate, allowing said plate to dry, developing same said plate in a third developer, ethyl acetate, whereby resorcinol, 2,4-dinitrosoresorcinol, 2,2',4,4',6,6'-hexanitrodiphenylamine, 2,4,6-trinitroresorcinol, and 2, 4-dinitroresorcinol are removed to separate distinguishable points on said plate.

7. The method of separating resorcinol, 2-nitrodiphenylamine and degradation products in the group consisting of 2,4 - dinitrodiphenylamine, 2,2',4,4',6,6'-hexanitrodiphenylamine, 2-nitroresorcinol, 2,4-dinitrosoresorcinol, 2, 4-dinitroresorcinol, and 2,4,6-trinitrorescorcinol from a mixture containing the same which comprises dissolving a sample of said mixture in a low boiling point inert organic solvent, spotting a small portion of the resulting solution on an absorbent surface comprising a thin layer of aluminum oxide contained in a gypsum binder affixed to a plate, developing the resulting spotted plate in a developer, toluene, whereby 2-nitrodiphenylamine, 2,4-dinitrodiphenylamine, and 2-nitroresorcinol are removed to separate distinquishable points on said plate, allowing said plate to dry, developing same said plate in water whereby 2,4-dinitrosoresorcinol, 2,4-dinitroresorcinol and 2,4,6-trinitroresorcinol are separated to separate distinguishable points of said plate, allowing said plate to dry, developing same said plate in acetone whereby resorcinol and 2,2',4, 4',6,6'-hexanitrodiphenylamine are removed to separate distinguishable points on said plate.

8. The method of separting resorcinol and degradation products in the group consisting of 2-nitroresorcinol, 2,4-dinitroresorcinol, 2,4-dinitrosoresorcinol, and 2,4,6-trinitroresorcinol from a mixture containing the same which comprises dissolving a sample of said mixture in a low boiling point inert organic solvent, spotting a small portion of the resulting solution or adsorbent surface comprising a thin layer of silica gel contained in a gypsum binder affixed to a plate, developing the resulting spotted plate in chloroform, whereby 2-nitroresorcinol is removed from point of composite sample spotted on said plate to a separate distinguishable point on said plate, allowing said plate to dry, developing same said plate in ether, whereby resorcinol, 2,4-dinitroresorcinol and 2,4,6-trinitroresorcinol are removed from point of composite sample spotted on said plate to separate distinguishable points on said plate, allowing said plate to dry, and developing same said plate in water, whereby 2,4-dinitrosoresorcinol is removed to a separate distinguishable point and said plate.

9. The method of separating resorcinol and degradation products in the group consisting of 2-nitroresorcinol, 2,4-dinitroresorcinol, 2,4-dinitrosoresorcinol, and 2,4,6-trinitroresorcinol from a mixture containing the same which comprises dissolving a sample of said mixture in a low boiling point inert organic solvent, spotting a small portion of the resulting solution on adsorbent surface comprising a thin layer of aluminum oxide contained in a gypsum binder affixed to a plate, developing the resulting spotted plate in chloroform whereby 2-nitroresorcinol is removed from the point of composite sample spotted on said plate to a separate distinguishable point on said plate, allowing said plate to dry, and developing same said plate in water whereby resorcinol, 2,4-dinitrosoresorcinol, 2,4-dinitroresorcinol, and 2,4,6-trinitroresorcinol are removed from said point to separate distinguishable points on said plate.

References Cited

UNITED STATES PATENTS 2,514,430  7/1950  Webb et al. -------- 260—576

FOREIGN PATENTS 982,345  2/1965  Great Britain.

OTHER REFERENCES

Chromatographic Adsorption and Silica Gel, publ. by the Davison Chemical Co., Baltimore, Md. (5 pages).

Yasula: J. Chromatog., vol. 14, p. 65–70 (1964), QD 241 J5.

CHARLES B. PARKER, *Primary Examiner.*

L. A. SEBASTIAN, R. V. HINES, *Assistant Examiners.*